US008145191B2

(12) United States Patent
Hammad et al.

(10) Patent No.: US 8,145,191 B2
(45) Date of Patent: *Mar. 27, 2012

(54) APPARATUS AND METHOD FOR PREVENTING WIRELESS INTERROGATION OF PHONES

(75) Inventors: Ayman Hammad, Pleasanton, CA (US); Phil Dixon, San Diego, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 12/400,170

(22) Filed: Mar. 9, 2009

(65) Prior Publication Data

US 2009/0227281 A1    Sep. 10, 2009

Related U.S. Application Data

(63) Continuation of application No. 11/165,969, filed on Jun. 24, 2005, now Pat. No. 7,522,905.

(51) Int. Cl.
*H04M 1/66* (2006.01)

(52) U.S. Cl. ...................................................... 455/410

(58) Field of Classification Search ............ 455/410, 455/550.1, 129, 90, 406, 74.1, 558, 559, 455/575.1, 120, 557, 556, 67.11; 380/53; 726/27, 28, 29, 35

See application file for complete search history.

(56) References Cited

U.S. PATENT DOCUMENTS

| | | | |
|---|---|---|---|
| 5,090,563 A | 2/1992 | Becker | |
| 5,288,942 A | 2/1994 | Godfrey | |
| 5,941,375 A | 8/1999 | Kamens et al. | |
| 6,079,621 A | 6/2000 | Vardanyan et al. | |
| 6,121,544 A | 9/2000 | Petsinger | |
| 6,122,490 A | 9/2000 | Hardman | |
| 6,400,270 B1 | 6/2002 | Person | |
| 6,502,135 B1 | 12/2002 | Munger et al. | |
| 6,826,616 B2 | 11/2004 | Larson et al. | |
| 6,859,831 B1 | 2/2005 | Gelvin et al. | |
| 6,920,440 B1 | 7/2005 | Barson | |
| 7,263,177 B1 | 8/2007 | Paterik et al. | |
| 7,302,705 B1 | 11/2007 | Boivie | |
| 2002/0046351 A1 | 4/2002 | Takemori et al. | |
| 2003/0145224 A1* | 7/2003 | Bailey | 713/201 |
| 2004/0107286 A1 | 6/2004 | Larson et al. | |
| 2004/0255167 A1* | 12/2004 | Knight | 713/201 |
| 2005/0033705 A1* | 2/2005 | Walmsley et al. | 705/67 |

(Continued)

FOREIGN PATENT DOCUMENTS

EP    0 822 513 A2    2/1998

(Continued)

OTHER PUBLICATIONS

U.S. Appl. No. 11/165,969, filed Jun. 24, 2005.

(Continued)

*Primary Examiner* — Melody Mehrpour
(74) *Attorney, Agent, or Firm* — Kilpatrick Townsend & Stockton LLP

(57) ABSTRACT

An apparatus and method is provided to prevent contactless portable electronic consumer devices such as an RF identification device (RFID), tokens, mini-cards, key fobs, cellular phones, smart card, etc. from being wirelessly interrogated. In one embodiment, a decoy circuit capable of detecting wireless interrogation signals transmitted to a contactless portable consumer device is used to prevent one or more interrogation devices from interrogating an authentic circuit in the contactless portable consumer device.

19 Claims, 6 Drawing Sheets

U.S. PATENT DOCUMENTS

2005/0050367 A1 3/2005 Burger et al.
2005/0091338 A1* 4/2005 de la Huerga ................ 709/217

FOREIGN PATENT DOCUMENTS

| EP | 1 313 027 A1 | 5/2003 |
| EP | 1 542 429 A1 | 6/2005 |
| JP | 2002/092564 A | 3/2002 |

OTHER PUBLICATIONS

English translation to Office Action from CN Patent Application No. 200680027723.4 dated Jun. 26, 2009, 8 pages.

English translation to Office Action from CN Patent Application No. 200680027723.4 dated Aug. 16, 2010, 3 pages.

* cited by examiner

APPARATUS AND METHOD FOR PREVENTING WIRELESS INTERROGATION OF PHONES

CROSS-REFERENCES TO RELATED APPLICATIONS

This patent application is a continuation of and claims priority to U.S. patent application Ser. No. 11/165,969, filed on Jun. 24, 2005, which is incorporated herein by reference for all purposes.

BACKGROUND OF THE INVENTION

The present invention relates in general to radio frequency communication and in particular to various embodiments of actively preventing portable electronic devices such as contactless smart cards from being wirelessly interrogated.

Generally, portable electronic devices such as contactless smart cards, key fobs, radio frequency identification devices (RFID), cellular phones, etc. are designed to provide the consumer with a way to engage in wireless communication and data exchange using radio frequency (RF) signals. For example, contactless smartcards allow a consumer to store and transmit financial data and other personal data to third parties such as banks. In another example, portable electronic devices such as RFIDs are used to wirelessly identify articles and allow monitoring of such articles during manufacturing, shipment, storage, etc. Due to the increased popularity of smartcards and RFIDs, it is envisioned that they will eventually be used for virtually all transactions involved in banking, health, insurance, social security, tracking, shipping, etc.

Because contactless electronic devices can operate without wires, contactless portable electronic devices are expected to replace other types of devices that require physical contact and/or physical connections to communicate with other devices and systems. Illustratively, smart cards are expected to replace regular credit cards, as they need not be in contact with a transaction terminal to be operated. Regular contact credit cards having magnetic strips and contact smartcards must come in contact with a reader. Similarly, RFIDs are expected to replace many of the bar code reading systems due to the fact that articles may be identified and tracked wirelessly.

A major benefit of contactless portable electronic devices is that they do not have to be removed from a user's wallet, briefcase, backpack, or purse to be used. Currently, an international standard has been established that sets a standard range between a contactless reader and the contactless portable electronic device. Therefore, a contactless portable electronic device may wirelessly exchange data with a contactless reader without the user having to remove the contactless portable electronic device from his wallet, purse, pocket, etc. as long as he is in range of the contactless reader. For simplicity and cost savings, contactless portable electronic devices often do not have embedded power sources (i.e., batteries). For example, smartcards and RFIDs have an antenna designed to receive RF signals from the contactless reader that is used to both power the smartcard/RFID devices, as well as enable them to communicate with the contactless reader.

Unfortunately, due to the wireless nature of the contactless portable electronic devices, it is entirely possible that a contactless reader may be used for surreptitious interrogation (e.g., data skimming) of the contactless portable electronic devices. In addition, it is conceivable that a contactless reader may be developed or modified to generate a much greater RF signal strength and sensitivity and thereby increase the standard range. Such an enhanced reader may allow surreptitious interrogation of the contactless portable electronic devices from a greater range.

As theft of sensitive information using wireless interrogation of contactless portable electronic devices is a major concern for consumers and businesses alike, law enforcement agencies are actively seeking ways to discover when such activity is taking place. Unfortunately, given the sophistication of the wireless interrogation equipment and the nature of wireless signals, it is easy for wireless interrogation to occur virtually at any time and place. Once the victim of the wireless interrogation discovers that they had sensitive information stolen, it is often too late to discover where the theft took place. Thus, the unauthorized interrogations may continue unabated.

Therefore, what is needed is a device and method that prevents the contactless portable electronic devices from unauthorized interrogation that is simple to use and is cost effective.

BRIEF SUMMARY OF THE INVENTION

Embodiments of the present invention provide an apparatus and method for preventing a contactless portable consumer device such as a smartcard, RFID, key FOB, tag, and the like from being wireless interrogated.

In one embodiment, the present invention provides a decoy circuit capable of detecting wireless interrogation signals transmitted to a contactless portable consumer device, wherein the decoy circuit is configured to prevent one or more interrogation devices from interrogating an authentic circuit in the contactless portable consumer device.

In another embodiment, the present invention provides a method including detecting a wireless interrogation signal from an interrogation device using a decoy circuit, responding to the wireless interrogation signal with the decoy circuit, wherein the response from the decoy circuit is more rapid than a response from a corresponding authentic circuit in a contactless portable consumer device, and providing decoy data to the interrogation device in response using the decoy circuit.

In another embodiment, the present invention provides for a system that includes a contactless portable consumer device, which includes authentic data, and a decoy device. The decoy device includes decoy data. The decoy device is adapted to provide the decoy data to an interrogation device before or instead of the authentic data.

In another embodiment, the present invention provides a method including obtaining a contactless portable consumer device and a decoy device, placing the contactless portable consumer device adjacent to the decoy device, receiving an interrogation signal at the contactless portable consumer device and at the decoy device from an interrogation device; and sending decoy data from the decoy device to the interrogation device.

These and other embodiments of the invention are described in further detail below.

DETAILED DESCRIPTION OF THE INVENTION

Figure 1:
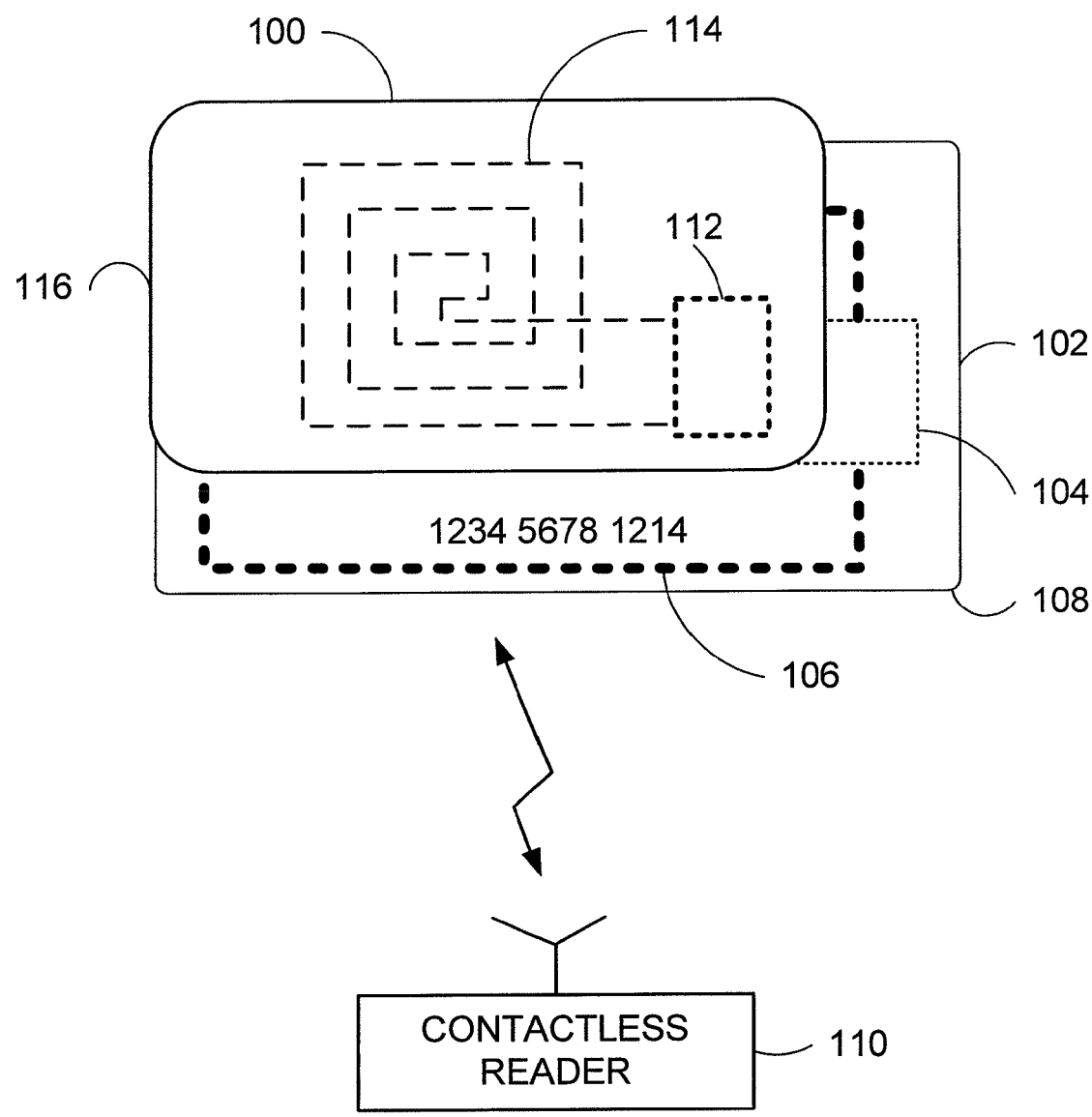
FIG. 1 is a front view illustrating one embodiment of a wireless decoy device positioned in proximity to a contactless portable consumer device in accordance with embodiments of the invention.

Embodiments of the present invention provide for a wireless decoy device and method of preventing a contactless portable consumer device from being wirelessly interrogated with an unauthorized interrogation device. An unauthorized interrogation device can be used to surreptitiously interrogate a portable consumer device when it is being shipped to a consumer or while the consumer is carrying it. The wireless decoy device may be separate from, attached to, or incorporated within the portable consumer device.

In one embodiment, the wireless decoy device has decoy data which may be sent to an unauthorized interrogation device instead of authentic data. Alternatively or additionally, such decoy data may allow the wireless decoy device to establish a communication lock or multiple sessions with an unauthorized interrogation device simulating one or more authentic devices so that data transfer (e.g., the unauthorized transfer of bank account numbers) between a contactless portable consumer device and the unauthorized interrogation device does not occur.

The contactless portable consumer devices according to embodiments of the invention may be in any suitable form. For example, the contactless portable consumer devices can be hand-held and compact so that they can fit into a consumer's wallet and/or pocket (e.g., pocket-sized). For example, the contactless portable consumer devices may include smartcards, ordinary credit or debit cards (with a magnetic strip and without a microprocessor), a keychain device (such as the Speedpass commercially available from Exxon-Mobil Corp.), key Fob, etc. Other examples of contactless portable consumer devices include cellular phones, personal digital assistants (PDAs), pagers, payment cards, security cards, access cards, smart media, transponders, and the like. Such contactless portable consumer devices can have one or more antennas that can transmit and/or receive signals and data through a wireless communication medium.

An exemplary contactless portable consumer device may include a memory such as a memory chip and/or a microprocessor. Either may be operationally coupled to the antenna in the contactless portable consumer device. The memory preferably contains information such as financial information or in the most simplistic form a built in wired logic. Financial information may include information such as bank account information, credit or debit card number information, account balance information, consumer information, etc. If the contactless portable consumer device is in the form of a debit, credit, or smartcard, the contactless portable consumer device may also optionally have features such as magnetic strips. Such devices can operate in either a contact or contactless mode.

The contactless portable consumer devices according to embodiments of the invention can be used with authorized interrogation devices (e.g., authorized readers) that can also have antennas. Such authorized interrogation devices may be present at point of sale (POS) terminals, ATM (automatic teller machines), and the like. Such interrogation devices are well known in the art.

FIG. 1 is a front view illustrating one embodiment of a wireless decoy device 100 disposed with respect to a conventional contactless portable consumer device 102. For purposes of illustration, the wireless decoy device 100 is described in terms of a general rectangular shape. However, it is to be understood that wireless decoy device 100 may have any shape as long as the wireless decoy device 100 prevents the transfer of data from the contactless portable consumer device 102. As shown in FIG. 1, the contactless portable consumer device 102 includes a processor 104 (or logic circuitry) and an antenna 106 integrated into a body 108. Processor 104 may also be a memory based hard wired logic. Generally, contactless portable consumer devices 102 do not contain power sources. They are powered by the wireless interrogation signals. For example, the antenna 106 is designed to receive wireless interrogation signals and provide power from such wireless interrogation signals to processor 104 for operation thereof.

The wireless decoy device 100 includes a wireless decoy circuit 112 coupled to a decoy antenna 114. The gain (the ability of the antenna to pick up signals) of decoy antenna 114 may be designed to increase the sensitivity of the wireless decoy device 100 to wireless interrogation signals. For example, the decoy antenna 114 may be increased in reception area as is known in the art to increase the signal reception properties by about 10 dB or more. The decoy antenna 114 may also be an active antenna having a gain boosting circuit as known. In another embodiment, the decoy antenna 114 may also be designed in shape and material to absorb sufficient wireless interrogation signal power to reduce the available power of surrounding wireless interrogation signals to a very low level making it more difficult for contactless reader 110 to activate the contactless portable consumer device 102. Advantageously, increased antenna gain provides the wireless decoy device 100 with the ability to detect wireless interrogation signals before the portable consumer device 102 is activated and/or can process the wireless interrogation signals. The wireless decoy circuit 112 and decoy antenna 114 are generally integrated into the body 116 of the wireless decoy device 100. Generally, the decoy antenna 114 may be a first antenna and is configured to be sensitive to a specific spectrum of RF signals used with an interrogation device such as contactless reader 110. In other words, the contactless portable consumer device 102 and wireless decoy device 100 are designed to receive signals from the contactless reader 110 within a particular range of frequencies. The contactless reader 110 includes a second antenna that transmits and/or receives a signal from the decoy antenna 116 and the antenna 106 of the contactless portable consumer device 102.

In one embodiment, the wireless decoy device 100 is an electronic decoy placed between the antenna of the contactless reader 110 and the contactless portable consumer device 102. The wireless decoy device 100 is designed to deceive (e.g., trick) the contactless reader 110 into believing that the wireless decoy device 100 is a legitimate contactless portable consumer device 102. The wireless decoy device 100 prevents the contactless reader 110 from interrogating the portable consumer device 102 by establishing a one-on-one communication link. The one-on-one communication link is designed to lock the contactless reader 110 into a singular communication session (e.g., an exclusive communication exchange) with the wireless decoy device 100.

The wireless decoy device 100 may also include a plurality of decoy antennas 116 coupled to a plurality of wireless decoy circuits 112 designed to simulate a plurality of authentic (i.e., legitimate) contactless portable consumer devices 102. In this embodiment, the plurality of decoy antennas 116, and wireless decoy circuits 112, may be used alone, or in combination, to simulate a plurality of different authentic contactless portable consumer devices 102 operating at different frequencies, different operating standards, and the like. In summary, the wireless decoy device 100 acts as one or more legitimate contactless portable consumer devices 102 which can establish a one-on-one session with one or more contactless readers 110 thereby preventing the one or more contactless readers 110 from interrogating one or more contactless portable consumer devices 102.

A consumer may legitimately use the contactless portable consumer device 102 with an authorized interrogation device by physically separating the contactless portable consumer device 102 from the decoy device 100. For example, the decoy device 100 and the portable consumer device 102 may be adjacent to each other in a person's wallet. The person may then remove the portable consumer device 102 from the wallet and may leave the decoy device 100 the wallet. The portable consumer device 102 may then be placed close to an authorized contactless interrogation device to conduct an authorized financial transaction. The decoy device 100 is out of the operating range of the authorized interrogation device so that decoy data is not sent to the authorized interrogation device.

In one embodiment, the body 116 of wireless decoy device 100 may be formed into a sticker for attachment to a contactless portable consumer device 102. The sticker is formed from one or more layers of polymers, metal alloys, or other conductive materials such as non-ferromagnetic materials such as aluminum, copper, brass, stainless steel, and the like, used to further shield the contactless portable consumer device 102 from wireless interrogation signals. The one or more layers of materials may be formed in a flexible carrier such as a paper or polymeric substrate. The sticker includes a temporary adhesive to temporarily affix the sticker to the contactless portable consumer device 102. The adhesive may be virtually any type of adhesive as is known that temporarily bonds items together.

The stickers may also have any suitable size or shape. The sizes and shapes of the stickers may correspond to the shapes and sizes of the contactless portable consumer device 102. In addition, in some embodiments, the size, shape, and material used in the sticker may be adjusted to optimize its signal detection properties relative to the frequency of operation for the particular contactless portable consumer device 102 being used. For example, the antenna 114 may be integrated as a part of the sticker and shaped to enhance its sensitivity. The stickers may also be printed with information pertinent to the user of the contactless portable consumer device 102. For example, the stickers may contain information such as instructions regarding how to activate a contactless portable consumer device 102 (e.g., by dialing a toll-free number and then following the recorded instructions).

Figure 2:
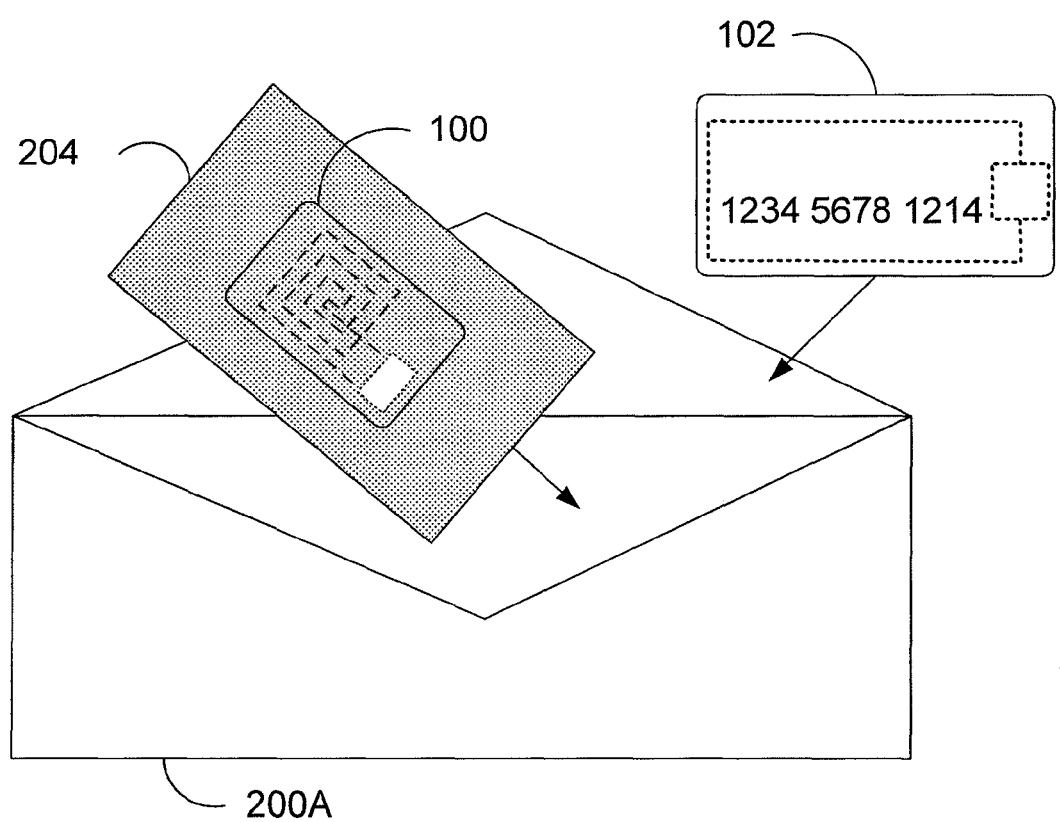
FIG. 2 is a front view illustrating one embodiment of an envelope used to store a wireless decoy device and a contactless portable consumer device in accordance with embodiments of the invention.

FIG. 2 is a front view illustrating one embodiment of an envelope 200 designed to hold a carrier 204, which includes a wireless decoy device 100, along with a contactless portable consumer device 102. The envelope 200 is an example of a flexible carrier. For clarity, a common envelope shape is illustrated. However, it is to be understood that any type of envelope or enclosure shape and/or configuration capable of holding the contactless portable consumer device 102 and the carrier 204 may be used. The carrier 204 may be separate from the envelope 200, attached to the envelope 200, or integrally formed with the envelope 200. For example, the carrier 204 may be an RF shield formed of a non-ferromagnetic conductive internal coating of envelope 200 used to shield the contactless portable consumer device 102 from wireless interrogation signals. Exemplary embodiments of RF shield may be found in co-pending patent application Ser. No. 11/165,901, docket number of 16222U-022200US, entitled "Apparatus And Method To Electromagnetically Shield Portable Consumer Devices" which is hereby incorporated by reference in its entirety, and is being filed on the same day as the present application.

The embodiment in FIG. 2 and the above-described sticker embodiments are particularly suitable when a portable consumer device is mailed to a consumer. As will be apparent from the description herein, these and other embodiments protect the contactless portable consumer device 102 from unauthorized data access when the contactless portable consumer device 102 is being transported through the mail or the like.

Figure 3A:
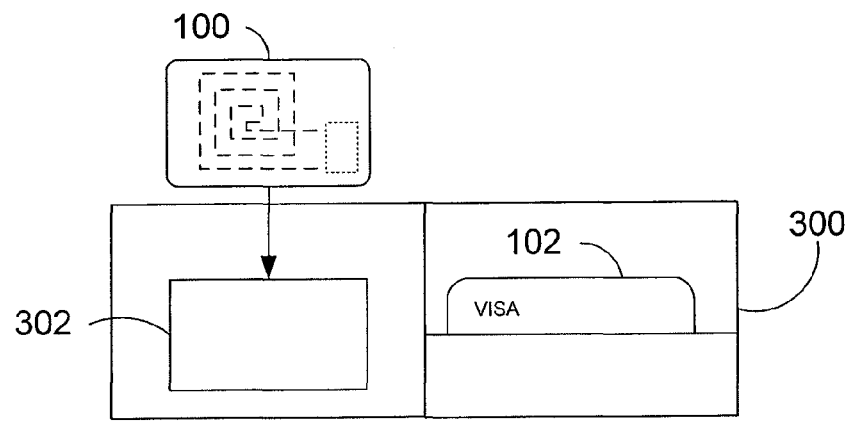
FIG. 3A is a front view illustrating one embodiment of a wallet having a wireless decoy device disposed therein in proximity to a contactless portable consumer device in accordance with embodiments of the invention.

FIG. 3A is a front view illustrating one embodiment of a wallet 300 having a wireless decoy device 100 being disposed therein with respect to a contactless portable consumer device 102. In one embodiment, the wireless decoy device 100 is designed to fit within a holder 302 of the wallet 300. The wallet 300 may be an example of a flexible carrier. The holder 302 may be any suitable storage area of the wallet 300 (e.g., pouch, recess, etc.). For example, the holder 302 may be a conventional credit card pocket. Illustratively, holder 302 may be configured to hold pictures or other items. The wireless decoy device 100 is configured to be positioned within holder 302 in proximity to contactless portable consumer device 102 such that, similar to wireless decoy device 100 described with respect to FIGS. 1-2 above, any RF signals within a frequency range and power level suitable for activating the contactless portable consumer device 102 are detected.

Figure 3B:
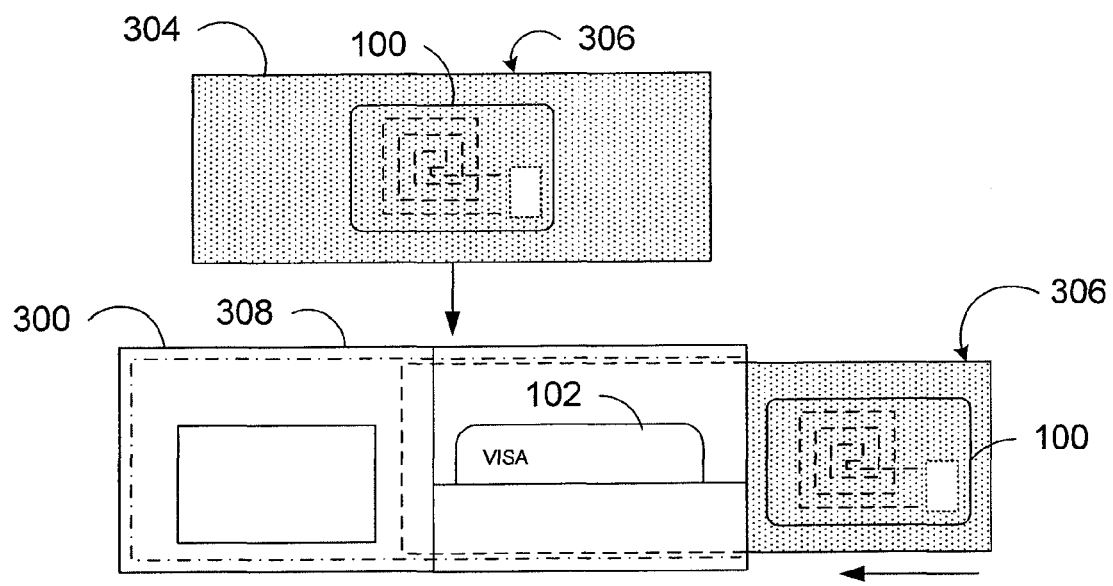
FIG. 3B is a front view illustrating one embodiment of a wallet having a wireless decoy device disposed on or integral to a liner positioned in proximity to a contactless portable consumer device in accordance with embodiments of the invention.

FIG. 3B is a front view illustrating an embodiment of a wallet 300 having a liner 304 integrated with a wireless decoy device 100 to form a decoy insert 306 positioned in proximity to a contactless portable consumer device 102. Similar to the carrier 204 described above, the decoy insert 306 is formed to be integrated with the wallet 300. In one embodiment, the decoy insert 306 is configured to slip into a conventional momentary holding pocket 308 extending, for example, lengthwise along the wallet 300. In another embodiment, the decoy insert 306 may be manufactured with the wallet 300 as a hidden liner. The decoy insert 306 may also be integrated with the wallet 300 such that some or all of the liner 304 is in view. For example, the liner 304 may be formed of one or more layers of conductive materials with a specialized design, color, surfaces, etc., to enhance the uniqueness of the wallet's look and feel. In either case (as a separate liner, or integrated into the wallet 300), the decoy insert 306 is configured to detect RF signals within the operation frequency range of the contactless portable consumer device 102.

Figure 4:
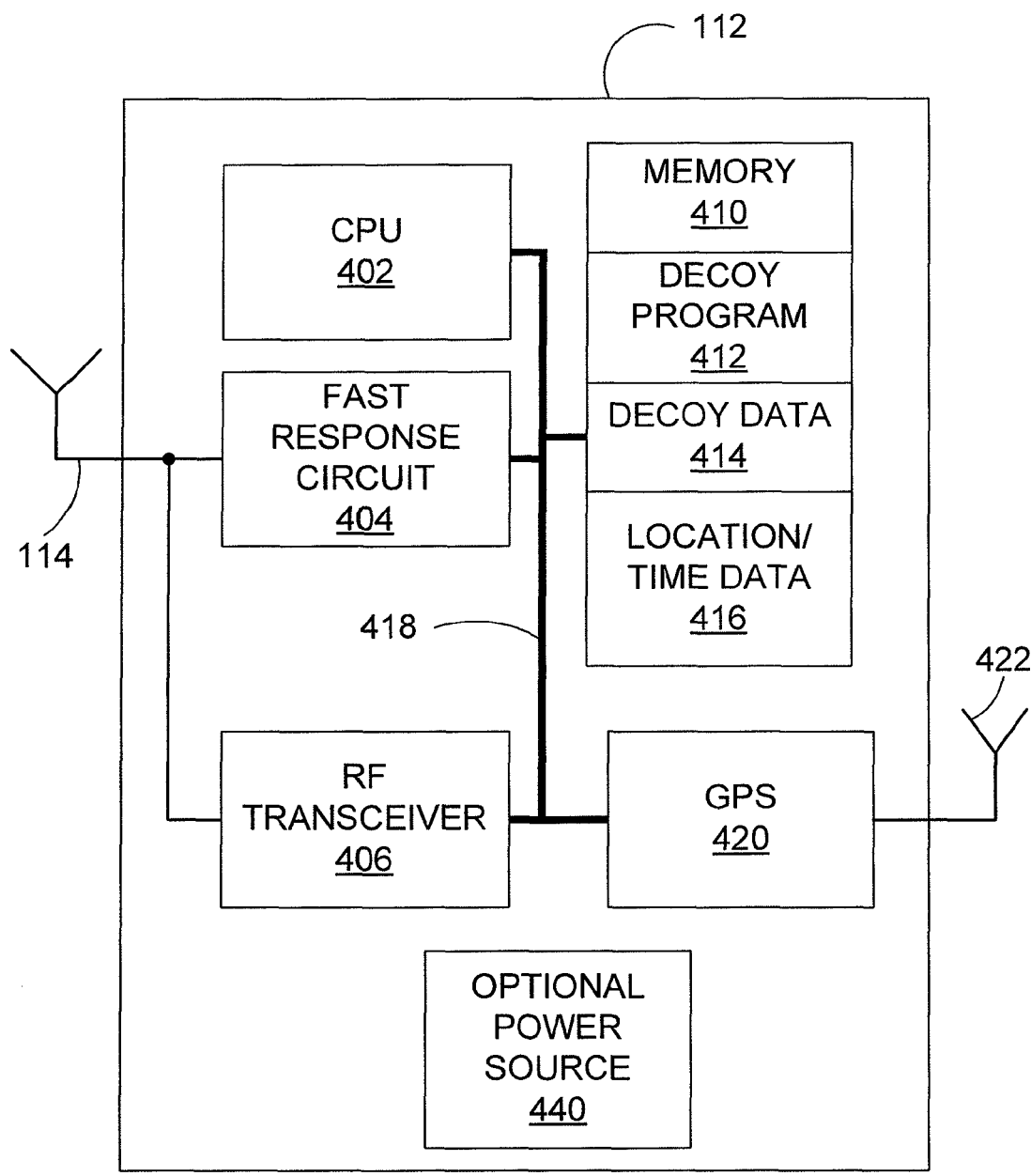
FIG. 4 is a high-level block diagram illustrating one embodiment of wireless decoy circuit in accordance with embodiments of the invention.

FIG. 4 is a high-level block diagram illustrating one embodiment of the wireless decoy device 112. Wireless decoy device 112 may be virtually any type of integrated circuit and/or data processing system such as a microprocessor, field programmable integrated circuit (FPGA), application specific integrated circuit (ASIC), and the like, that may be configured to perform embodiments of the present invention to advantage. In one embodiment, wireless decoy circuit 112 includes Central Processing Unit (CPU) 402, a fast response circuit 404, a RF transceiver circuit 406, and a memory 410 in communication therewith via bus 418. CPU 402 may be under the control of an operating system that may be disposed in memory 410. Virtually any operating system or portion thereof supporting the configuration functions disclosed herein may be used. In one embodiment, CPU 402 may be hardwired logic circuitry, and the like, adapted to operate wireless decoy circuit 112.

To enhance the operation of the wireless decoy device 100 to detect and process wireless interrogation signals, the wireless decoy circuit 112 may include an optional power source 440. The power source 440 allows the wireless decoy circuit 112 to be receptive to wireless interrogation signals without using such signal for power. Power source 440 may be virtually any number and type of standalone power sources such as batteries, solar power sources, fuel cells, and the like, that are capable of operating wireless decoy circuit 112 for a predetermined period.

In one embodiment, the fast response circuit 404 is used to detect wireless interrogation signals before the contactless portable consumer device 102 has a chance to activate and/or respond to the contactless reader 110. In one embodiment, the fast response circuit 404 is designed with one or more high speed RF detection circuits such as diode detection circuits, mixer detection circuits, and other circuits designed to detect the wireless interrogation signals at a power level of at least that of, or less, than the contactless portable consumer device 102. Optionally, to avoid false detection, the fast response circuit 404 may employ conventional RF signal filtering such as band pass, low pass, and high pass filters, that only pass a selected RF signal spectrum, generally within the operational frequency range of the contactless portable consumer device 102.

The RF transceiver 406 may be designed to receive wireless interrogation signals and transmit communication signals to the contactless reader 110 via antenna 114. Any number of wireless communication devices well known in the art may be used to accomplish the reception and transmission of data between contactless reader 110 and the contactless portable consumer device 102. For example, the RF transceiver 406 may be formed from a wireless receiver in combination with a wireless transmitter as is known. In another example, the RF transceiver 406 may be similar to the transceiver circuitry (not shown) integral to the contactless portable consumer device 102. In other words, virtually any wireless transceiver system that is sized accordingly and capable of communicating with contactless reader 110 may be used.

The RF transceiver 406 may also be configured to transmit an alert on different frequencies, or the same frequency, to alert others, and/or the user of the wireless decoy device 100, about the wireless interrogation signals. The RF transceiver may transmit the alert either separately and/or simultaneously and may use different communication protocols to keep the interrogation device from discerning that the wireless decoy device 100 is a decoy. For example, the alert communication may be transmitted using any viable communication link such as Bluetooth, 802.11x, cellular network, RF, and the like. For example, consider a case where a contactless reader 110 is attempting an unauthorized interrogation of a contactless portable consumer device 102 during shipment. When the fast response circuit 404 detects wireless interrogation signals, the RF transceiver 406 transmits communication protocols to the contactless reader 110 to establish a communication link. Simultaneously, or at a later time, the RF transceiver 406 may also transmit data alerting a third party, such as a law enforcement agency, that a contactless reader 110 has attempted to and/or accessed the wireless decoy device 100. Advantageously, in this embodiment, as the wireless decoy device 100 is in proximity to the contactless portable consumer device 102, the wireless decoy device 100 is capable of detecting wireless interrogation signals in real time and transmitting an alert to any receiver system configured to receive the alert. In one embodiment, in addition to, or in lieu of, the wireless alert described above, the wireless decoy device 100 may include an indicator (not shown), such as an light emitting diode (LED), speaker, vibrator, and the like. For example, the LED may illuminate and/or the speaker may produce a tone to indicate that it is being interrogated by a contactless reader 110.

Memory 410 is preferably a random access memory sufficiently large to hold the necessary programming and data structures of the invention. While memory 410 is shown as a single entity, it should be understood that memory 410 may in fact comprise a plurality of modules, and that memory 410 may exist at multiple levels, from high speed registers and caches to lower speed but larger direct random access memory (DRAM) chips. In one embodiment, memory 410 may include a decoy program 410 that, when executed on CPU 402, controls at least some data processing operations of wireless decoy circuit 112. The decoy program 410 may use any one of a number of different programming languages. For example, the program code can be written in PLC code (e.g., ladder logic), a higher-level language such as C, C++, Java, or a number of other languages. While decoy program 410 may be a standalone program, it is contemplated that decoy program 410 may be combined with other programs.

The decoy program 410 is configured to control the wireless decoy circuit 112 such that when wireless interrogation signals are detected by the fast response circuit 404, the decoy program 410 establishes a decoy communication link with the contactless reader 110 associated with the wireless interrogation signals. To establish the communication link, the decoy program 410 operates CPU 402 to perform a variety of activities in response to wireless interrogation signals. For example, the decoy program 410 provides decoy data 414 via RF transceiver 404, described below, to establish and maintain a one-on-one communication dialog with the contactless reader 110. In one embodiment, during a communication session, the decoy program 410 and CPU 414 may process "a turn off" or "halt" requests from the contactless reader 110, but will ignore such requests to stop or turn off. This allows the wireless decoy device 100 to continue the interrogation process, thereby providing one way for the wireless decoy device 100 to lock the contactless reader 110 into a one-on-one communication session.

In other embodiments, the decoy program 410 and CPU 402, may process data related to the wireless interrogation signals for storage thereof in memory 410. For example, the decoy program 410 and CPU 402 may process the time, date, power level, frequency, and the like, associated with wireless interrogation signals for storage thereof in memory 410.

In one embodiment, memory 410 includes decoy data 414. Decoy data 414 is used to provide bogus data (e.g., fake data) to the contactless reader 110 via RF transceiver 406. For example, such decoy data 414 may include decoy financial transaction detail, decoy communication protocols, decoy communication messages, and the like, which is intended to deceive the contactless reader 110 into believing that it is communicating with a legitimate contactless portable consumer device 102. In other embodiments, the decoy data 414 may provide seed data. The seed data may be used to capture an unauthorized wireless interrogation device. For example, the seed data may be specific account numbers and information that are readily traceable by financial institutions, law enforcement agencies, etc. In other examples, such seed data may allow the unauthorized user to process financial and other types of legitimate looking transactions that ultimately may be traced to particular groups and/or individuals.

In one embodiment, the decoy data 414 includes multiple sets of device simulation data to ensure that it can provide multiple responses to the contactless reader 110 thereby simulating multiple authentic devices to the contactless reader 110. For example, the multiple sets of simulated data enable the wireless decoy device 100 to assume any number of different identities to the contactless reader 110. Therefore, when the contactless reader 110 is finished interrogating one identity, the wireless decoy device 100 may take on a new identity for the contactless reader 110 to interrogate. For example, as a consumer may have more than one smartcard in their wallet (or purse), the wireless decoy device 100 may take on the multiple sets of simulated data to simulate those smartcards or many other types of contactless portable consumer devices 102. This embodiment is advantageous as it enables the wireless decoy device 100 to remain in communication with the contactless reader 110 that believes that it is interrogating more than one contactless portable consumer device 102. Thus, this embodiment enables the wireless decoy device 100 a way to lock the contactless reader 110 in virtually an unlimited amount of one-on-one communication sessions.

Optionally, memory 410 includes location/time data 416. In one embodiment, location/time data 416 is data gathered by a global positioning system (GPS) or other devices and systems used to track geographic and/or time. For example, wireless decoy circuit 112 may include an optional GPS 420 with GPS antenna 422, which provides the geographic location of the wireless decoy circuit 112. The GPS 420 may be virtually any type of geographic location system, such as a wireless triangulation system, and may be integrated with a clock or timing device that can provide date and time information. Advantageously, such geographic and/or time data may be used to track unauthorized wireless interrogation. For example, consider the case where a piece of luggage (not shown) is being shipped with an RFID flex tag along with a wireless decoy device 100, the time and/or geographic data may be transmitted to other devices used, for example, by law enforcement agencies to detect where and/or when a wireless interrogation is occurring as the luggage is being transported.

Figure 5:
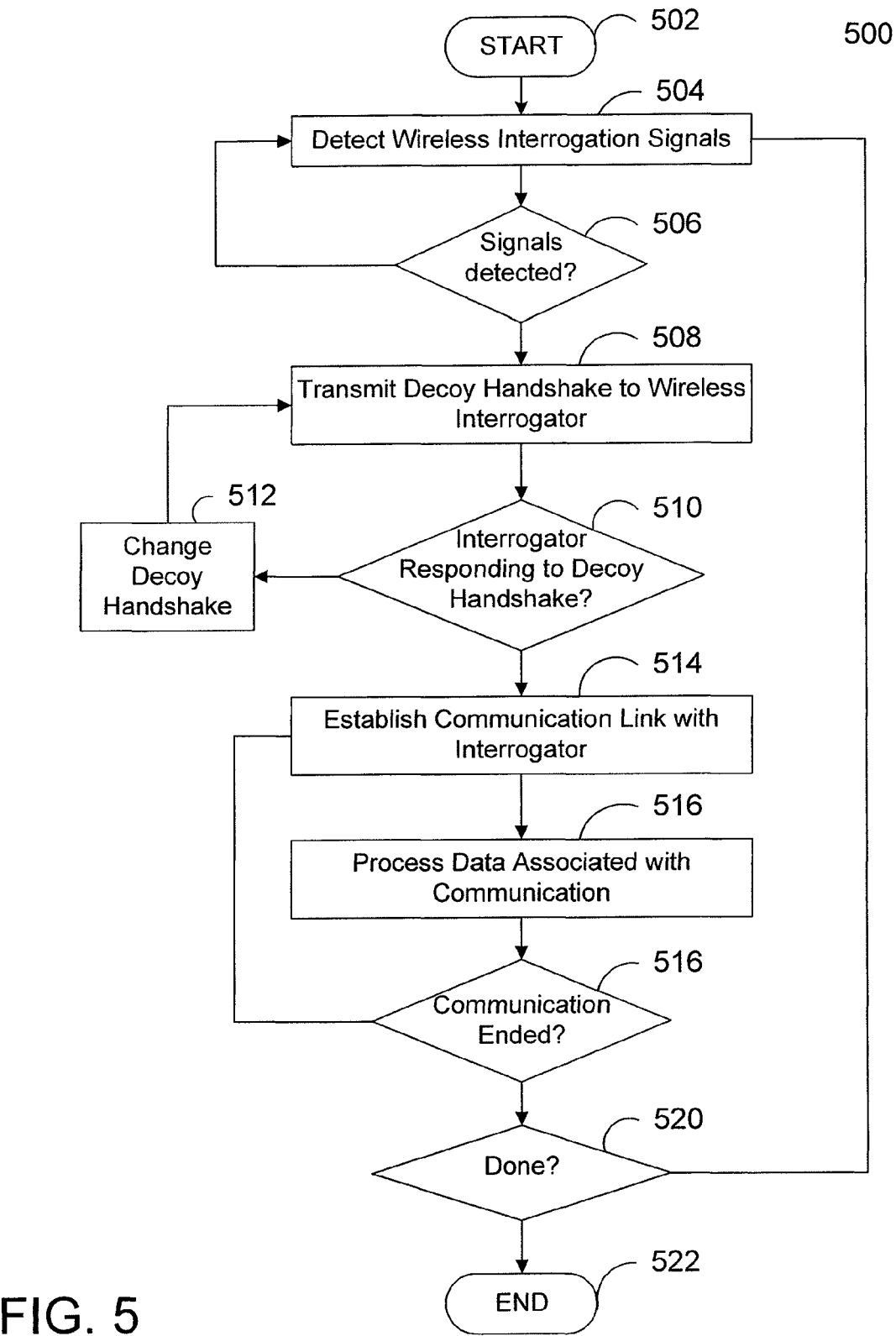
FIG. 5 is a high-level flow diagram illustrating one embodiment of a method of preventing wireless interrogation of a contactless portable consumer device in accordance with embodiments of the invention.

FIG. 5 is a high-level flow diagram illustrating one embodiment of a method 500 of preventing wireless interrogation of a contactless portable electronic device 102. Method 500 may be entered into at step 502 when, for example, a wireless decoy device 100 detects wireless interrogation signals. At 504, method 500 is seeking wireless interrogation signals. At step 506, the method 500 determines whether or not any wireless interrogation signals have been detected. For example, in one embodiment, wireless decoy device 100 may be activated by wireless interrogation signals which are then detected by fast response circuit 404. In other embodiments, method 500 does not require that the wireless interrogation signals act as a power source. If no wireless interrogation signals are detected at step 506, method 500 returns to 504 and continues to actively seek out wireless interrogation signals at step 506. If however, one or more wireless interrogation signals are detected, then a decoy handshake is transmitted to one or more interrogation devices (e.g., contactless readers 110) at step 508. If at step 510, the handshake protocol is not correct, then the method 500 proceeds to step 512 to determine a different handshake protocol and returns to step 508. However, at step 510, if the handshake is accepted by an interrogation device, then at step 514, the method 500 establishes a one-on-one communication link, or multiple concurrent sessions, with the interrogation device. At step 516, decoy data 414, for example, may be provided to the interrogation device. The decoy data 414 is designed to deceive the interrogation device into believing that it is communicating with a legitimate contactless portable consumer device 102.

In other embodiments, at step 516, some of the communication may pertain to discovering more about the interrogation device that is attempting to wirelessly interrogate a contactless portable consumer device 102. For example, method 500 may inquire directly from the interrogation device, for example, who the interrogation device is, where the interrogation device is located, and the like. The method 500 may also receive data associated with the wireless interrogation from other sources besides the interrogation device. For example, the method 500 may request and receive data such as the type and frequency of the wireless interrogation signal, the number of interrogation attempts, and the like. In one embodiment, the method 500 may also include receiving data pertaining to the location and/or time of the wireless interrogation as described below with regard to method 600. At step 518, if the communication link is ended, for example, by the wireless decoy circuit 112 moving out of range of the interrogation device, the method 500 proceeds to 520. At step 520, method 500 determines if it is finished, if so, then the method 500 ends at step 522. If, however, at step 520, the method 500 is not finished, then it returns to 504 to detect wireless interrogation signals.

Figure 6:
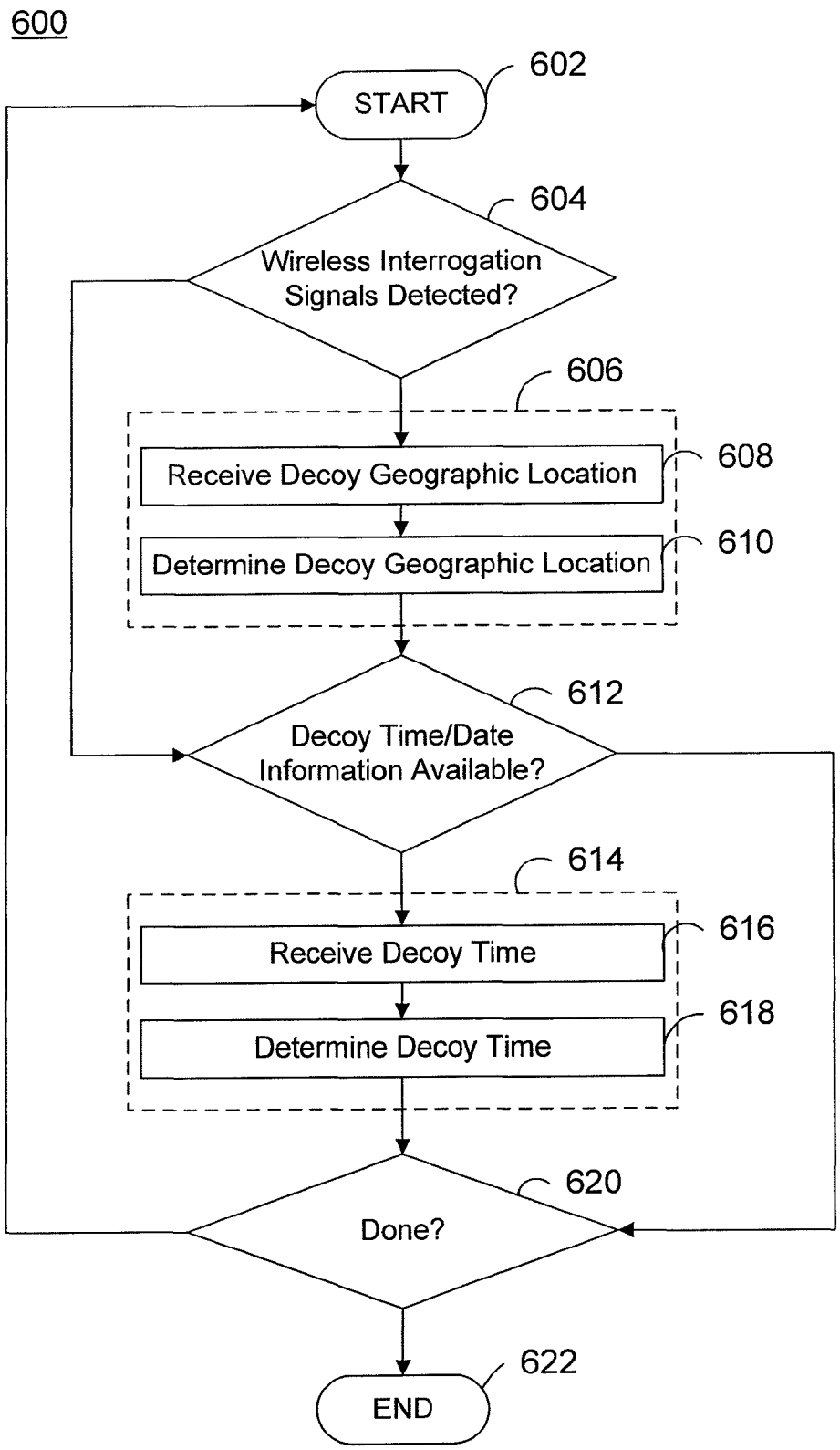
FIG. 6 is a high-level flow diagram illustrating one embodiment of a method of determining the location and/or time of a wireless interrogation of a contactless portable consumer device, in accordance with embodiments of the invention.

FIG. 6 is a high-level flow diagram illustrating one embodiment of a method 600 of determining during wireless interrogation other information, including information associated with the geographic location and/or time of when a wireless decoy device 100 is surreptitiously interrogated. Method 600 may be entered into at step 602 when for example the wireless decoy device 100 detects wireless interrogation signals. Similar to method 500, method 600 does not require the wireless interrogation signals be used as a power source. At step 604, the method 600 determines whether or not there are any wireless interrogation signals. If there are wireless interrogation signals, then at step 606 the method 600 determines a geographic location of the wireless interrogation. For example, consider the case where a person carrying a wallet 300 contactless portable consumer devices 102 and a wireless decoy device 100 is passing in proximity to a interrogation device. As the person passes in range of the interrogation device, at step 606, the method 600 determines the approximate geographic location of the wireless decoy device 100. In one embodiment, the method 600 at step 608 receives geographic data from a GPS 420 located in proximity of, or integral to, the wireless decoy device 100. At step 610, the method 600 processes the geographic data received at step 608 and determines the geographic location. In one embodiment, processing the geographic data can occur in the wireless decoy device 100 as part of the decoy program 410, and/or may also occur in a third party processing system, for example, a processing system used by law enforcement. Method 600 at step 612 determines if the time and date data associated with the wireless decoy device 100 is available. If the time and/or date data is not available, then the method 60 proceeds to 620 described below. If, however, the time and/or date data is available then at step 614, method 600 stores the time and/or date of the wireless interrogation (e.g., stores the time and/or date information in memory 410). For example, at steps 616 and 618, the method 600 receives and determines the time and date of when the wireless interrogation occurred. At step 620, the method 600 determines if it is finished. For example, the wireless decoy device 100 may be separated from the contactless portable consumer device 102, and/or is disabled. If the method 600 is not finished, then at step 620, the method returns to 602. If, however, method 600 is finished, it ends at step 622.

Any of the above described functions may be may be implemented as computer code in a computer program-product for use with a computer system. The program can be provided to a computer via a variety of computer-readable media (i.e., signal-bearing medium), which include but are not limited to, volatile and non-volatile memory devices including RAMs, ROMs, EEPROMs, magnetic strips, etc.

It is apparent to one skilled in the art that various changes and modifications can be made to this disclosure, and equivalents employed, without departing from the spirit and scope of the invention. Elements shown with any embodiment are exemplary for the specific embodiment and can be used on other embodiments within this disclosure.

What is claimed is:

1. A phone comprising:
   a decoy circuit configured to detect wireless interrogation signals transmitted to the phone and to prevent one or more interrogation devices from interrogating an authentic circuit in the phone by deceiving the one or more interrogation devices into believing the decoy circuit is the authentic circuit.

2. The phone of claim 1, further comprising a memory that includes at least financial information or health information, and combinations thereof.

3. The phone of claim 1, wherein the decoy circuit comprises an antenna that is at least as sensitive as an antenna associated with the phone.

4. The phone of claim 1, wherein the decoy circuit comprises a detection circuit that responds more quickly to the wireless interrogation signals than the phone.

5. The phone of claim 1, wherein the decoy circuit comprises a decoy program configured to simulate the authentic circuit.

6. The phone of claim 1, wherein the decoy circuit comprises decoy data configured to simulate data associated with the phone.

7. The phone of claim 1, wherein the decoy circuit comprises a location device capable of determining where the decoy circuit detected the wireless interrogation signals.

8. The phone of claim 1, wherein the decoy circuit comprises a timing device capable of determining when the decoy circuit detected the wireless interrogation signals.

9. The phone of claim 1, further comprising a transceiver configured to transmit an alert indicating that the wireless interrogation signals have been transmitted to the phone.

10. A method for preventing interrogation of a phone comprising:
    detecting a wireless interrogation signal from an interrogation device using a decoy circuit; and
    responding to the wireless interrogation signal with the decoy circuit, wherein the response from the decoy circuit is more rapid than a response from a corresponding authentic circuit in the phone, and wherein the response from the decoy circuit is configured to deceive the interrogation device into believing the decoy circuit is the authentic circuit.

11. The method of claim 10, wherein detecting the wireless interrogation signal comprises detecting the wireless interrogation signal at a signal level lower than the phone can detect.

12. The method of claim 10, further comprising determining a geographic location of the phone.

13. The method of claim 10, further comprising sending an alert indicating that a wireless interrogation signal has been transmitted to the phone.

14. A system comprising:
    a phone comprising authentic data; and
    a decoy device comprising decoy data,
    wherein the decoy device is adapted to provide the decoy data to an interrogation device, the decoy data being configured to deceive the interrogation device into believing the decoy data is the authentic data.

15. The system of claim 14, wherein the decoy device is adapted to respond to a signal from the interrogation device before the phone responds to the signal when both the phone and the decoy device are within an operating range of the interrogation device.

16. The system of claim 14, wherein the authentic data comprises financial information.

17. A method for preventing interrogation of a phone having authentic data comprising:
    placing the phone adjacent to a decoy device;
    receiving an interrogation signal at the decoy device from an interrogation device; and
    sending decoy data from the decoy device to the interrogation device, wherein the decoy data is configured to deceive the interrogation device into believing the decoy data is the authentic data.

18. The method of claim 17, further comprising sending the authentic data to the interrogation device after the decoy data is sent from the decoy device.

19. The method of claim 17, wherein the decoy data comprises a decoy account number.

* * * * *